United States Patent [19]
Delingat

[11] 3,906,220
[45] Sept. 16, 1975

[54] OPTICAL CORRELATOR

[75] Inventor: Eckart Delingat, Hermannstein, Germany

[73] Assignee: Ernst Leitz G.m.b.H., Germany

[22] Filed: Nov. 19, 1973

[21] Appl. No.: 417,203

[30] Foreign Application Priority Data
Dec. 8, 1972 Germany............................ 2260086

[52] U.S. Cl. ............. 250/227; 250/237 G; 250/578
[51] Int. Cl.$^2$............................................ G01D 5/26
[58] Field of Search................ 250/237 G, 227, 578

[56] References Cited
UNITED STATES PATENTS

| 3,399,347 | 8/1968 | Martens.......................... 250/227 X |
| 3,430,057 | 2/1969 | Genähr............................... 250/227 |
| 3,483,389 | 12/1969 | Cronin............................ 250/227 X |
| 3,509,354 | 4/1970 | Reilly, Jr............................. 250/227 |
| 3,571,796 | 3/1971 | Brugger.......................... 250/578 X |

*Primary Examiner*—James W. Lawrence
*Assistant Examiner*—T. N. Grigsby
*Attorney, Agent, or Firm*—Gilbert L. Wells

[57] ABSTRACT

An optical correlator for filtering out image structures with specific spatial frequencies and/or for determining or measuring the relative spatial position of an object, comprising at least one photoelectric receiver connected in series with this image divider and determining and converting light fluxes leaving the image plane, characterized in that the front faces (6',7') of at least two optical fiber bundles (6,7) are provided as image dividers and that the receiver or receivers (10,11) is/are associated with the other ends of the fiber bundles.

13 Claims, 7 Drawing Figures

OPTICAL CORRELATOR

CROSS-REFERENCES TO RELATED APPLICATIONS

Applicant claims priority under 35 U.S.C. 119 for Application P 22 50 086.8, filed Dec. 8, 1972 in the Patent Office of the Federal Republic of Germany.

The disclosure of U.S. Applications Ser. Nos. 283,967, now abandoned, and Ser. No. 334,601 now U.S. Pat. No. 3,856,400, filed Aug. 28, 1972 and Feb. 22, 1973 respectively and having the same assignee as the present invention are incorporated herein. These applications disclose the state of the art of apparatus for no-contact measurement and particularly disclose the use of a pyramidal grating and a pyramidal grating having a plurality of colors, the method for converting the spatial frequency into a speed proportional time frequency, how the magnitude and direction of an object-movement is determined from the grating movement, the electronic circuitry used, how the magnitude and/or velocity are obtained, and how the push-pull signals are evaluated.

BACKGROUND OF THE INVENTION

The field of the invention is mensuration or configuration comparison using relatively movable plural optical grids.

The present invention relates to an optical correlator for filtering out image structures with specific spatial frequencies and/or for determining or measuring the relative spatial position of an object, comprising at least one photoelectric receiver which is connected in series with this image divider and which determines and converts the light beams leaving the image plane.

Optical correlators provided with various types of image dividers are known, in which the image structures to be correlated are superimposed on reference structures and the resulting light beams measured. Simple one or two dimensional amplitude gratings, as well as phase gratings and screen structures, are suitable for use as reference structures. Grooved screens, prismatic screens and pyramid screens have been found to be particularly efficient screen structures.

The state of the art of the optical correlators and the gratings used therein may be ascertained by reference to U.S. Pat. Nos. 3,198,061 and 3,482,107 of Hock, U.S. Pat. No. 3,651,250 showing a color grating having a plurality of color transmission sections and British Pat. No. 1,249,302 of Gardiner showing a pyramid grating useful in the present invention.

The object of the present invention is to provide other devices which split up an optical image into portions in a definite manner and which direct the light beams associated with the portions as completely as possible and in a predetermined combination onto one or more photoelectric receivers. It is also an object of the invention to provide non-obvious and efficient embodiments of optical correlators.

This task is solved by an optical correlator of the type mentioned initially which is characterized in that the front faces of at least two optical fiber bundles are provided as image dividers and that the receiver or receivers is/are connected to the other ends of the fiber bundles. A plurality of fiber bundles collected together in groups may be provided. Embodiments thereof are characterized in that the fiber bundles with their front faces located in the image plane are arranged according to groups in an alternating manner after the fashion of a screen. Alternatively, the fiber bundles with their front faces disposed in the image plane are arranged in alternating strips according to the group to which they belong. Alternatively, the individual partial fiber bundles are split up in the image plane into stochastically distributed, interlaced individual fibers. The size of the screen elements may be chosen in such a way that they aperiodically divide the image which is detected in at least one coordinate direction. In another embodiment, the properties such as the diameter, nature of the cross section, material, color, etc., of the optical fibers in the individual bundles are chosen in such a way that they only transmit light of a specific polarization or color. The optical correlator is advantageously used in such a way that the direction or directions defined by the screen elements or strips in the image plane forms/form an angle differing from $n \cdot 90°$ with the direction of movement of the object, n being a whole number.

Optical fiber bundles useful in the present invention are disclosed in U.S. Pat. Nos. 2,825,260, 2,992,516, and 3,581,099, and in "Fiber Optics" by N. S. Kapany, Academic Press, New York, 1967.

A correlator according to the invention can also be provided with an additional conductor group which directs the light coming from a source into the plane of the object.

BRIEF DESCRIPTION OF THE DRAWINGS

Other features of an embodiment of the invention which are provided by way of example will become apparent from the following detailed description thereof made with reference to the accompanying drawings, in which:

FIG. 1a is a detailed showing of a portion of the grating used in FIG. 1;

DESCRIPTION OF THE PREFERRED EMBODIMENTS

Figure 1:
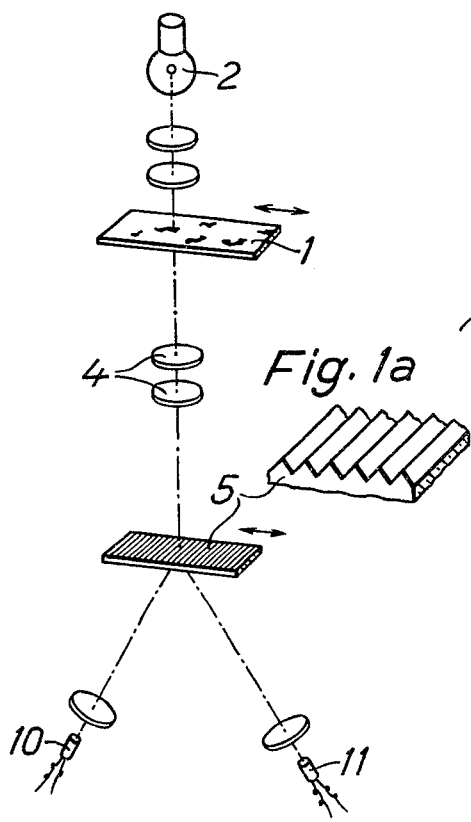
FIG. 1 shows a correlator of the prior art for measuring in one coordinate direction.

FIG. 1 shows a known optical correlator system comprising a transillumination grating in the form of an equal-sided prismatic grating. The object 1 which is illuminated by a light source 2 is reproduced in an image plane by way of a lens 4 in which the grating 5 is located. Two photoelectric receivers 10, 11 which are arranged to cooperate with the grating pick up the beam portions which are deflected in two discrete directions by the screen 5. The measurement of the relative movement of the object with respect to the optical axis of the optical system described according to one coordinate direction is obtained from the relationship of these two signals. To obtain measurements according to two coordinate directions, it is necessary according to the state of the art, to provide two such correlator systems which are oriented with respect to each other according to the spatial positions of the two desired measuring directions.

Figure 2:
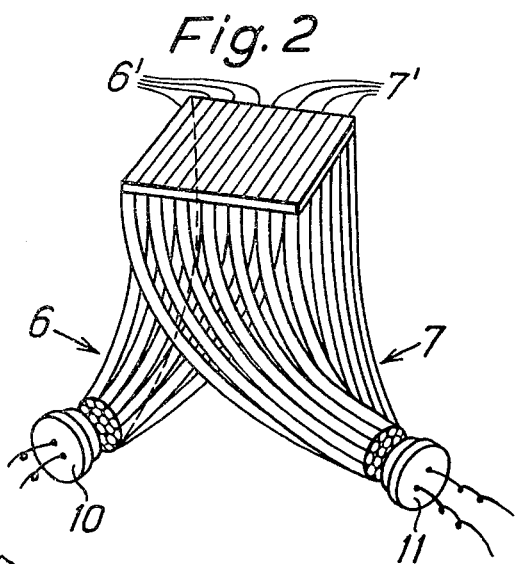
FIG. 2 shows a grating provided with optical fibers.

A correlator system according to the invention contains an optical fiber arrangement in place of the screen 5, as is shown by way of example in FIG. 2. With this arrangement, the optical fibers are divided into two groups 6 and 7 and are arranged adjacent to each other in such a way that the front faces 6' and 7' of the individual groups form adjacent strips in the image plane of the correlator system, thereby forming a pattern having a similar effect to the prism of the screen 5. One of the photoelectric receivers 10, 11 is provided for the other front face of each group.

Figure 3:
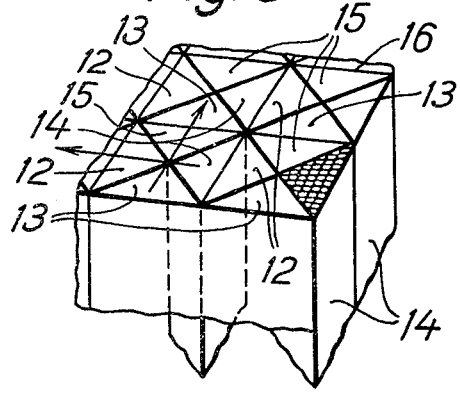
FIG. 3 shows a grating for measuring in two coordinate directions.

To obtain measurements according to two directions of coordinates, a photoconductor arrangement may be provided in which the optical fiber bundles are further split up to form four photoconductor groups 12 – 15 which are themselves split up and are arranged with the conductors of the other groups in such a way that a frontal surface pattern according to FIG. 3 is produced in the image plane. Respectively those two photoconductor groups, the conductors of which in a single square 16 of the reticle form with their front surfaces two triangles, which only meet at their corners are used for signal formation according to that measuring direction being defined by the angle bisector of the angles adjacent to the point of contact of the triangles.

Figure 4:
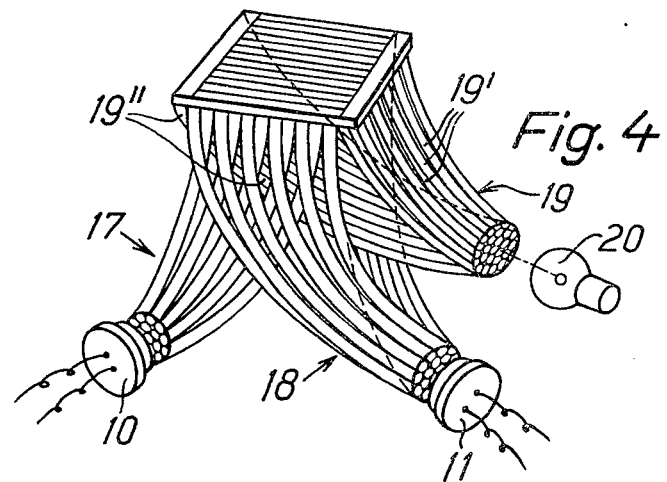
FIG. 4 shows a grating provided with an additional optical fiber group for illuminating the object.
Figure 5:
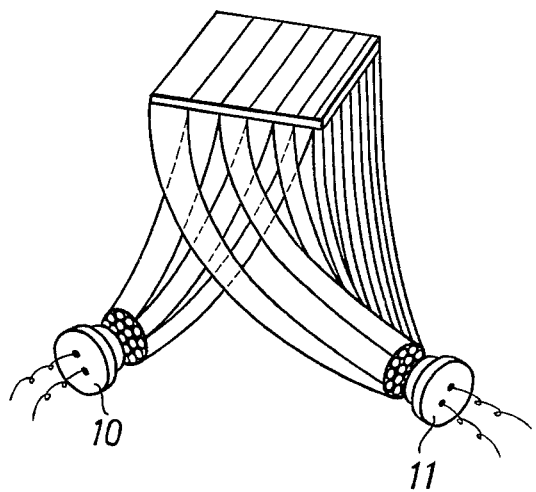
FIGS. 5 and 6 show gratings with respectively aperiodical and stochastic division.
Figure 6:
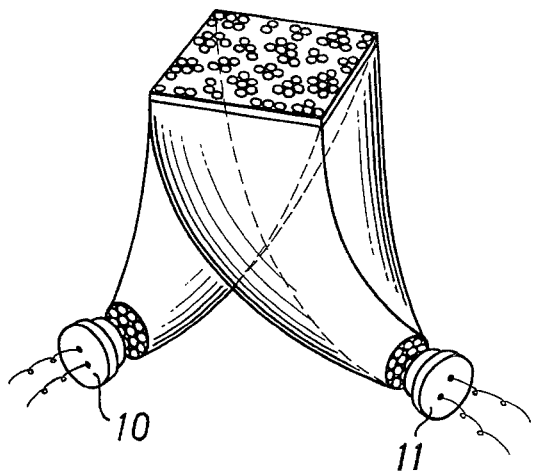

Apart from the embodiments represented in FIGS. 2, 3 and 4, it is also possible to provide other arrangements of the photoconductors within the individual groups or within the arrangement as a whole. For example, the photoconductors of two or more groups may be mixed together in such a way that the front faces of the groups are stochastically or aperiodically distributed with respect to each other in the image plane as shown in FIG. 6 or FIG. 5 respectively. An arrangement of the former nature has the advantage that it is possible to determine the movement of objects with any spatial frequencies in any desired direction.

An advantage of the correlator according to the present invention is that the image divider used therein enables good spatial adjustment of the modulated light flows to the geometry of the photoelectric receivers.

Another advantage of the new correlator as compared to the known or previously described correlators consists in that the new correlator operates with a higher light yield, thereby enabling less well illuminated objects to be accurately determined and their movement measured.

Another possible embodiment of the optical fiber bundle is shown in FIG. 4. As is apparent from this figure, the bundle in this case is divided into three conductor groups 17, 18 and 19. Two of these groups 17, 18 are arranged as shown in FIG. 2 as conductor groups 6 and 7. The bundle 19 is divided into two parts 19', 19'', the front faces of which flank the measuring plane formed by the front faces of the other two groups. In the embodiment represented, this third photoconductor group 19 is used to illuminate the object. Accordingly, it is possible to measure opaque objects with this arrangement.

It is obvious to orient an image divider provided with strip-form divisions in such a way that the direction of the strips is at right angles to the measuring direction. An orientation which deviates from this makes it possible to produce signals, the frequency of which depends not only on the speed of the object in the main measuring direction, but also on the movement at right angles thereto.

I claim:

1. In an optical correlator having an imaging lens, at least one optical device for filtering out image structures with specific spatial frequencies for determining the respective relative spatial position of an object, and a photoelectric receiver system having at least one receiver and coordinated to said optical device and generating electrical signals corresponding to the relative position between an image of said object and said optical device, said electrical signals conducted to a control system, the improvement comprising said optical device comprising an image divider having a plurality of optical fiber bundles arranged in groups, each group having a front face, in combination with the front faces of other fiber bundle groups forming an optical grating, and each said group having a rear end associated with a receiver of said receiver systems, the ends of a plurality of bundle groups, the front faces of which are not lying side by side, are associated with one receiver.

2. The correlator of claim 1, wherein the front faces of said fiber bundle groups have the shape of strips arranged in parallel to one another.

3. The correlator of claim 2, wherein said strips of the bundle groups have different widths forming an aperiodic grating.

4. The correlator of claim 1, wherein said front faces in neighboring positions are associated by their groups of optical fiber bundles with different common receivers of the receiver system.

5. The correlator of claim 1, wherein the front faces of said fiber bundle groups have a three-cornered shape.

6. The correlator of claim 1, wherein the grating formed by the fiber bundle means define an angle with the direction of movement of an object differing from $n \cdot 90°$, wherein $n$ is an integer.

7. The correlator of claim 1, wherein an additional photo-conductor group (19) is provided which directs light coming from a source (20) into the plane of the object.

8. In an optical correlator having an imaging lens, at least one optical device for filtering out image structures with specific spatial frequencies for measuring the respective relative spatial position of an object, and a photoelectric receiver system having at least one receiver and coordinated to said optical device and generating electrical signals corresponding to the relative position between an image of said object and said optical device, said electrical signals conducted to an indicator and control system, the improvement comprising said optical device comprising an image divider having a plurality of optical fiber bundles arranged in groups, each group having a front face, in combination with the front faces of other fiber bundle groups forming an optical grating, and each said group having a rear end associated with a receiver of said receiver system, the ends of a plurality of bundle groups, the front faces of which are not lying side by side, are associated with one receiver.

9. The correlator of claim 8, wherein the front faces of said fiber bundle groups have the shape of strips arranged in parallel to one another.

10. The correlator of claim 9, wherein said strips of the bundle groups have different widths forming an aperiodic grating.

11. The correlator of claim 8, wherein said grating has an image plane and the individual fiber bundles of said optical fiber bundle means are split up in said image plane into stochastically divided, interlaced individual fibers for measuring velocity and detecting movement.

12. The correlator of claim 8, wherein the fibers of all groups coordinated to one measuring direction are dimensioned to give the transmitted light a given polarization.

13. The correlator of claim 8, wherein the fibers of all groups coordinate to one measuring direction are dimensioned to give the transmitted light a given color.

* * * * *